Jan. 26, 1971 R. R. SCHABERG 3,559,143
APPARATUS FOR GENERATING TRIGONOMETRIC FUNCTIONS
CORRESPONDING TO ANGULAR MOVEMENT
Filed July 11, 1969
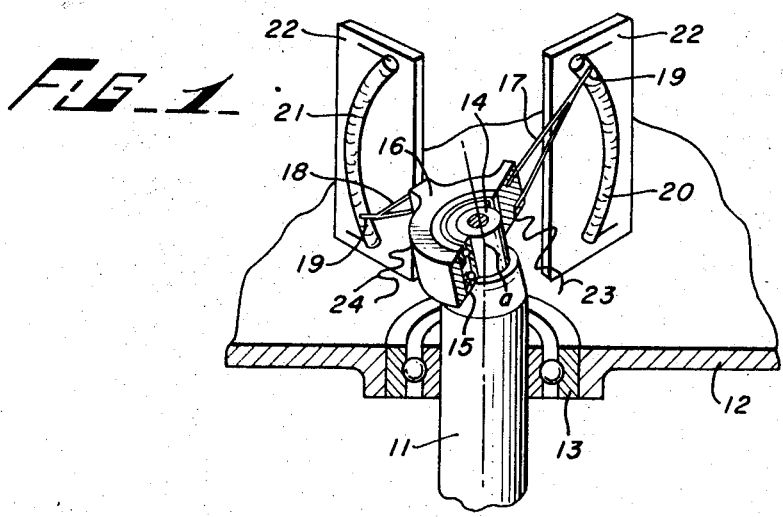
FIG_1_
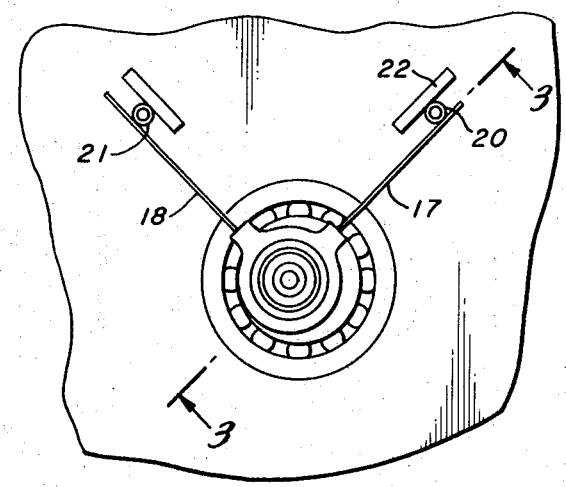
FIG_2_
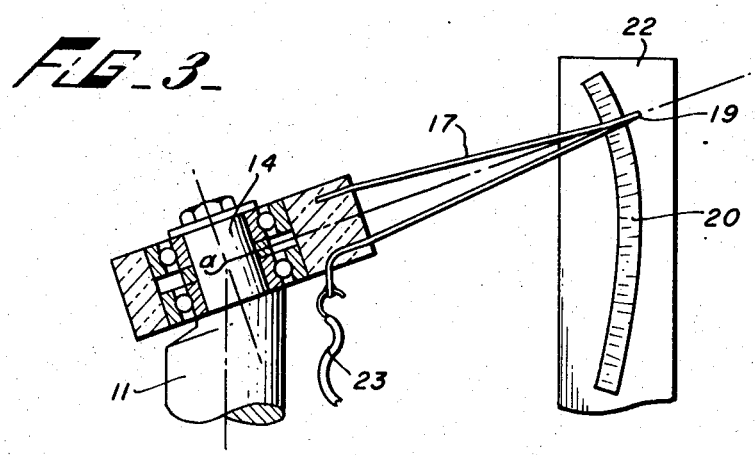
FIG_3_
INVENTOR.
RICHARD R. SCHABERG
BY
ATTORNEY.

United States Patent Office 3,559,143
Patented Jan. 26, 1971

3,559,143
APPARATUS FOR GENERATING TRIGONOMETRIC FUNCTIONS CORRESPONDING TO ANGULAR MOVEMENT
Richard R. Schaberg, Alhambra, Calif., assignor to Clary Corporation, San Gabriel, Calif., a corporation of California
Filed July 11, 1969, Ser. No. 840,990
Int. Cl. H01c 5/02
U.S. Cl. 338—89                                4 Claims

ABSTRACT OF THE DISCLOSURE

A device for generating electrical sine and cosine function signals corresponding to the angle of movement of a rotatable input shaft wherein a spindle is formed integral with one end of the shaft and at an acute angle thereto. The spindle rotatably supports a brush carrier carrying two wiper brushes located at 90 degrees to each other. The brushes wipe along respective ones of a pair of linearly wound potentiometer windings to produce output signals which are 90 degrees out of phase with each other.

---

This invention relates to apparatus for generating trigonometric functions corresponding to the angle of rotation of a rotary element and has particular reference to apparatus for generating electrical signals corresponding to the sine and/or cosine of an angle through which a shaft or the like is moved.

In analog computing apparatus, ordnance equipment, flight simulators and similar systems where continuous trigonometric functions of a rotating or rocking element are required, resolver units are generally provided which produce a mechanical or electrical output signal which varies in accordance with the sine and/or cosine function of the angle through which the element is moved.

Eventual electrical outputs are generally desired. However, in those electrically generated systems of which I am aware, sine and cosine function signals have usually been generated from a rotary element by the use of potentiometers having sine-cosine function configurations. Such potentiometers are difficult and expensive to manufacture, and at that have limitations in accuracy.

Mechanical devices have also been used heretofore to mechanically generate sine and cosine functions. Such devices employ Scotch yoke mechanisms for translating rotary motion into sinusoidal movement and such movement is applied to linear potentiometers. However, such mechanisms of which I am aware are expensive to manufacture and tend to bind or stick at ceratin points in their movement. Mechanisms employing gears or gear trains tend to be inaccurate because of gear backlash.

It therefore becomes a principal object of the present invention to provide a relatively inexpensive yet highly accurate sine and/or cosine function generating device capable of operating under high vibration and shock environments, such as is experienced in connection with gyrocsopes.

Another object is to provide a sine and/or cosine function generating device in which an output can be obtained from a continuously rotatable element without the need for slip rings.

Another object is to provide a simple and inexpensive but highly accurate sine and/or cosine function generating device using linearly wound potentiometers.

Another object is to provide a sine and cosine function generating device using a pair of potentiometers in which the wiper brush pressure for the potentiometers is always the same.

Another object is to provide a sine and cosine function generating device operable by a rotatable element wherein torque reaction against the element is extremely low.

The manner in which the above and other objects of the invention are accomplished will be readily understood on reference to the following specification when read in conjunction with the accompanying drawings, wherein:

FIG. 1 is a perspective view, partly in section, of a sine-cosine generating device constructed in accordance with the present invention.

FIG. 2 is a top plan view of the generating device.

FIG. 3 is a sectional view taken substantially along line 3—3 of FIG. 2.

Describing the sine-cosine generating device in detail, an input shaft 11 is rotatably supported in a housing partly indicated at 12 by ball bearings, one of which is shown at 13. The housing may, for example, be the housing of a free gyroscope, in which case the shaft 11, which may have a movement of 360 degrees or more, is attached to one of the gyroscope gimbals.

A small spindle section 14 is formed integral with the upper end of the shaft 11. The spindle extends at approximately 15 degrees of the axis of the shaft 11 and its axis intersects the same at point $a$.

A pair of ball bearings 15 on the spindle section 14 rotatably support a plastic brush carrier 16 in which is embedded a pair of somewhat flexible wire wiper brushes 17 and 18. The bearings 15 are preferably equi-spaced on opposite sides of the point $a$ and the tips 19 of the brushes are preferably located on a line normal to the axis of spindle section 14 and passing through point $a$.

As shown in FIG. 2, the brushes 17 and 18 extend at 90 degrees to each other when viewed from the top and are arranged to wipe over respective linearly wound resistor or potentiometer windings 20 and 21. The latter are supported by plastic brackets 22 suitably supported from the housing frame 12.

Flexible conductors 23 and 24 are connected to the respective ones of the brushes and are connected to suitable circuitry (not shown) which is to be controlled by the device. The ends of the potentiometer windings are also connected in a manner, not shown, to such circuitry.

It will be noted that the potentiometer windings are in the form of helical coils which are arcuately shaped and are preferably located concentric with point $a$. Also, brushes 17 and 18 wipe along complementarily arranged points on the two potentiometer windings. The brushes have sufficient stiffness so that they will not yield as a result of rotation of the shaft 11. Thus, as the shaft 11 rotates, the brushes will move in such relation to the potentiometer windings as to generate signals corresponding to the sine and cosine functions of the angle through which the shaft moves.

Since the brushes 17 and 18 react equally and oppositely against the potentiometer windings, the brush pressure will be in balance at all times and since only the ball bearings 13 and 15 react against the brush pressure, a relatively large amount of pressure can be applied by the brushes without effecting a noticeable reaction to rotation of the shaft 11. This is of utmost importance in the application of the device as a pickoff for a gyroscope wherein minute frictional forces can cause detrimental drift or procession effects.

Also, since the extent of movement of the carrier 16 is relatively small regardless of the angle through which the shaft 11 is rotated or regardless of the number of turns through which the shaft is rotated, very little flexing need be imparted to the conductors 23 and 24.

I claim:

1. A device for generating trigonometric function signals proportional to the angular movement of a rotatable input member comprising:
   a rotatable input member,
   a bearing element integral with said input member and extending at an acute angle thereto,
   a pair of electrical resistance elements extending lengthwise of the axis of said input member,
   said elements being disposed at an angle to each other about said input member,
   a pair of wiper brushes movable along respective ones of said resistance elements, and
   a brush carrier rotatably supported by said bearing element and supporting said brushes.

2. A device according to claim 1 wherein said resistance elements are dipsosed at 90 degrees to each other and said resistance elements have linear resistance characteristics whereby the resistance of a circuit through said brushes and said resistance elements will vary in accordance with the sine and cosine functioins proportional to the angular movement of said input member.

3. A device according to claim 1 wherein said resistance elements are curved to lie at least substantially in the paths of movement of said brushes during rotation of said input member.

4. A device according to claim 1 wherein said resistance elements extend substantially concentric with the point of intersection of the axes of said input member and said bearing element.

References Cited

UNITED STATES PATENTS

| | | | |
|---|---|---|---|
| 2,502,786 | 4/1950 | Hayslett | 338—89X |
| 3,314,004 | 4/1967 | Grob | 338—89X |
| 3,351,749 | 11/1967 | Smith | 338—130X |

LEWIS H. MYERS, Primary Examiner

G. P. TOLIN, Assistant Examiner

U.S. Cl. X.R.

338—128